(12) United States Patent
Osmani

(10) Patent No.: US 9,422,114 B2
(45) Date of Patent: Aug. 23, 2016

(54) DEVICE FOR PRODUCING AN ARCHIMEDES SCREW

(75) Inventor: Samir Osmani, Dunkirk (FR)

(73) Assignee: EXVENTYS, Saint Quentin (FR)

( * ) Notice: Subject to any disclaimer, the term of this patent is extended or adjusted under 35 U.S.C. 154(b) by 237 days.

(21) Appl. No.: 13/808,327

(22) PCT Filed: Jul. 4, 2011

(86) PCT No.: PCT/FR2011/000390
§ 371 (c)(1),
(2), (4) Date: Feb. 8, 2013

(87) PCT Pub. No.: WO2012/004470
PCT Pub. Date: Jan. 12, 2012

(65) Prior Publication Data
US 2013/0126309 A1     May 23, 2013

(30) Foreign Application Priority Data

Jul. 5, 2010 (FR) ...................................... 10 02824
Mar. 15, 2011 (FR) ...................................... 11 00773

(51) Int. Cl.
    *B65G 33/26*      (2006.01)
    *B65G 33/32*      (2006.01)

(52) U.S. Cl.
CPC .............. *B65G 33/26* (2013.01); *B65G 33/265* (2013.01); *B65G 33/32* (2013.01); *B65G 2207/30* (2013.01)

(58) Field of Classification Search
CPC ...... B65G 33/00; B65G 33/265; B65G 33/32; B65G 33/26; B65G 2207/30
USPC ......................................... 198/662, 666, 676
See application file for complete search history.

(56) References Cited

U.S. PATENT DOCUMENTS 2,308,075 A * 1/1943 Hahn ........................ F23K 3/14
    198/666
2,492,915 A * 12/1949 Carlson .................. B65G 33/32
    198/666

(Continued)

FOREIGN PATENT DOCUMENTS

DE      90 15 999      3/1991
EP      0 200 117      4/1985

(Continued)

OTHER PUBLICATIONS

International Search Report dated Oct. 17, 2011 in corresponding PCT application.

*Primary Examiner* — Leslie A Nicholson, III
*Assistant Examiner* — Keith R Campbell
(74) *Attorney, Agent, or Firm* — Young & Thompson

(57) ABSTRACT

Disclosed is a device for improving the method of manufacturing Archimedes screws by assembling sectors on a shaft without forming gaps, cutting edges or weak regions between one another and ensuring the continuity of the turns of which the screw consists. It consists of a sector having a turn with a length equal to one screw thread and having a geometry that enables it to be interlocked with another, identical sector. The turn sits on a core, the geometry of which is obtained by following in each case a helical generatrix which is offset through at least one turn thickness. The terminal face of the turn is inclined at an angle with respect to the axis of the sector. The device according to the invention is particularly intended for the production of systems for metering or pumping viscous, pulverulent or granular products, the systems including at least one Archimedes screw.

11 Claims, 9 Drawing Sheets

(56) References Cited

U.S. PATENT DOCUMENTS

| | | | | |
|---|---|---|---|---|
| 3,178,210 A | * | 4/1965 | Dickinson | E21B 17/22 175/323 |
| 3,705,644 A | * | 12/1972 | Kawchitch | B65G 33/00 198/664 |
| 4,187,030 A | * | 2/1980 | Godley | G03G 15/0822 198/666 |
| 4,852,719 A | * | 8/1989 | Lapeyre | B65G 33/265 198/658 |
| 4,976,341 A | * | 12/1990 | Lundell | B65G 33/265 198/666 |
| 5,044,489 A | * | 9/1991 | Barsk | B28B 1/084 100/145 |
| 5,099,985 A | * | 3/1992 | Lapeyre | B65G 33/265 198/658 |
| 5,687,832 A | * | 11/1997 | Thiessen | B65G 33/265 198/676 |
| 7,641,001 B2 | * | 1/2010 | Mash | E21B 10/44 175/323 |

FOREIGN PATENT DOCUMENTS

| | | |
|---|---|---|
| NL | 7 100 884 | 7/1971 |
| WO | 2008/001171 | 1/2008 |

* cited by examiner

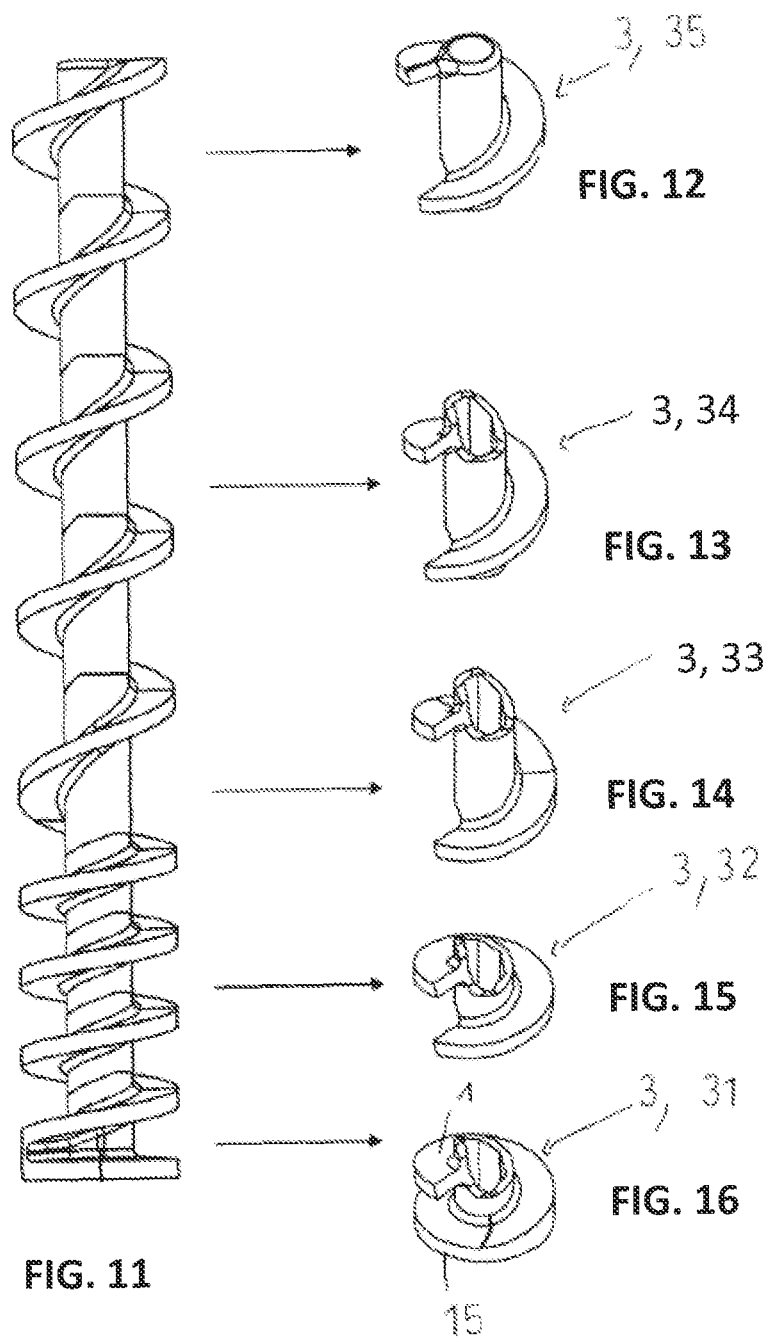

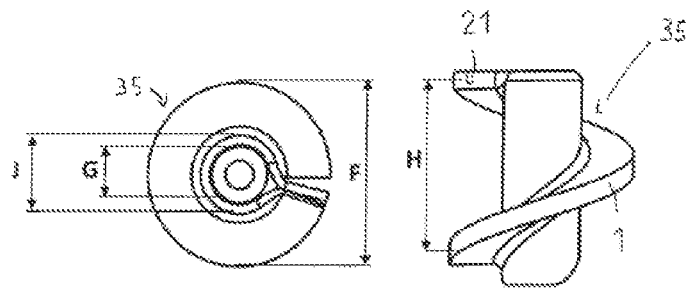
FIG. 12a   FIG. 12b
FIG. 12c
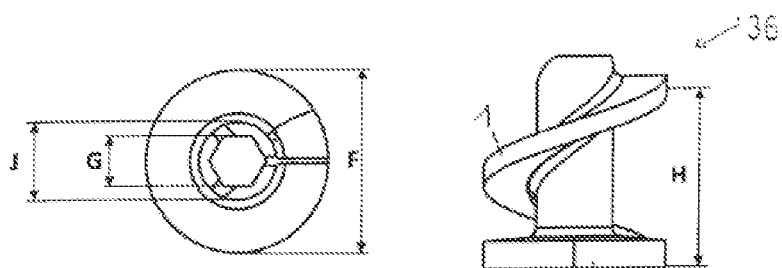
FIG. 17a   FIG. 17b
FIG. 17c

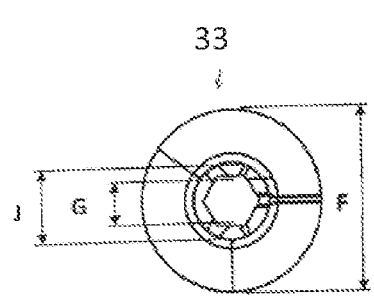
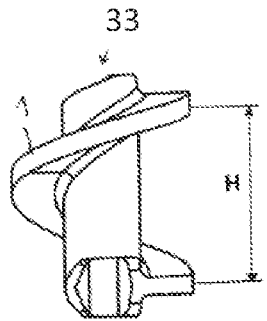
FIG. 14a  FIG. 14b
| F | H | J | G |
|---|---|---|---|
| 50 | 50-25 | 25 | 17 |
| 80 | 80-40 | 34 | 22 |
| 100 | 100-50 | 45 | 32 |
| 150 | 150-75 | 55 | 36 |
FIG. 14c
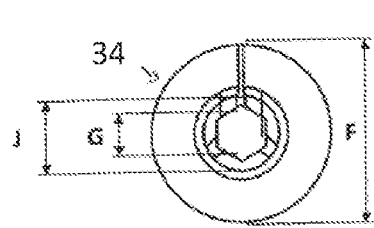
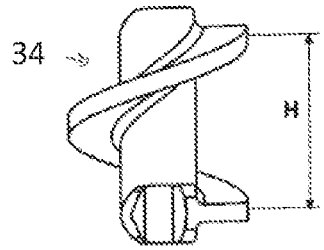
FIG. 13a  FIG. 13b
| F | H | J | G |
|---|---|---|---|
| 50 | 50 | 25 | 17 |
| 80 | 80 | 34 | 22 |
| 100 | 100 | 45 | 32 |
| 150 | 150 | 55 | 36 |
FIG. 13c

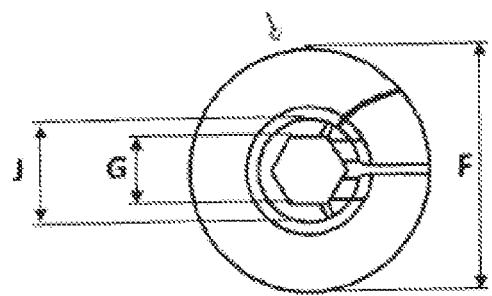
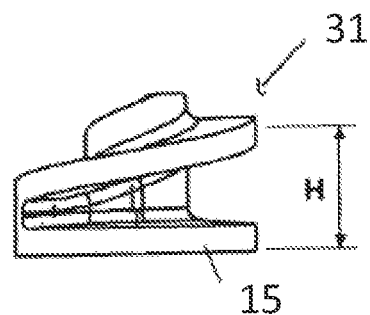
FIG. 16a      FIG. 16b
| F | H | J | G |
|---|---|---|---|
| 50 | 50 | 25 | 17 |
| 80 | 80 | 34 | 22 |
| 100 | 100 | 45 | 32 |
| 150 | 150 | 55 | 36 |
FIG. 16c
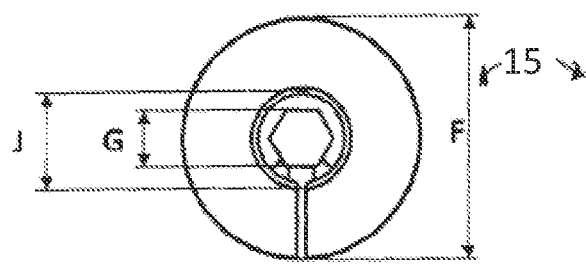
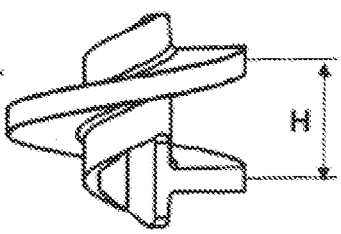
FIG. 15a      FIG. 15b
| F | H | J | G |
|---|---|---|---|
| 50 | 25 | 25 | 17 |
| 80 | 40 | 34 | 22 |
| 100 | 50 | 45 | 32 |
| 150 | 75 | 55 | 36 |
FIG. 15c

DEVICE FOR PRODUCING AN ARCHIMEDES SCREW

The present invention relates to device for producing an Archimedes screw, improving the method of manufacturing Archimedes screws by assembling sectors of the prior art. These screws are used for manufacturing systems for metering or pumping viscous fluids, liquids containing solid matter, or solids in powder in powder or granule form and behaving as viscous fluids.

More specifically, this invention is particularly useful for simply producing systems for metering or pumping corrosive liquid products or in the form of granules.

The principle of the Archimedes screw has existed for more than 22 centuries. Throughout all countries and all ages, numerous solutions for producing such equipment have been implemented. The reference works on the design and production methods for Archimedes screws drafted by Mr Davaine and dating from 1835 and 1846 present the prior art on these techniques. The main production methods consist generally of making the threads from helicoidal sections welded, adhesively bonded or mechanically fixed to a central shaft made from metal or wood. Some screws are produced by machining in the mass. A variant makes it possible to produce the threads by filamentary winding. Many companies have generated an activity based on the sale of small elements made from cropped and curved metal making it possible to produce screws to measure generally assembled by fabrication. The choice of materials remains limited and the time taken for producing Archimedes screws remains long. One of the solutions frequently implemented by persons skilled in the art consists of producing several sectors of threads, machined or cast, and then assembling them a shaft. The shape of the shaft, for example hexagonal or cylindrical with a key groove, provides close connection with the various sectors. This shaft makes it possible to transmit the rotation force from the motor driving the screw to the various sectors. This method makes it possible to produce very long screws simply, to vary the pitch or the geometry, to add particular functions of scraping or specific screw noses adapted to the service environments. These particular cases of screws assembled by sectors on a shaft and present for many years in the public domain have the particularity of having conical terminations. The choice of materials that can be used for producing the sectors is much wider than that normally encountered in fabrication and makes it possible, in place of metal, to use plastics or thermosetting material and even terracotta. The nature of the material forming the shaft may vary according to the torque to be transmitted. It may be metal, thermoplastic or composite. These solutions are particularly suited to producing very long screws that have to withstand a high torque for moving a very viscous fluid that is for example to pass through a sieve. The use of sectors also makes it possible to replace only one damaged area during operation instead of completely replacing the whole screw.

The drawback of the latter embodiment of screws by sectors stems from the lack of continuity of the turns when they are assembled on the central shaft and the loss of contact surface affording transmission of the rotation torque. The sectors have several long pitches because of the need of provide a certain mechanical strength when high forces are transmitted and they cannot have a short length essential for producing screws of small size for metering systems, or for producing modular screws of different dimensions, among other things suitable for manufacturing metering systems.

The turns of each section are connected by progressive reduction of its thickness until terminating on a very fine edge in the form of a bevel. This solution allowing manufacture by successive stacking of the sectors leads, during use of the screw, to the deformation of the junction areas of the turns resulting from the introduction of solid particles between the connection areas of the sectors. A very sharp edge then forms that may lead to damage to the product to be conveyed, in particular when it is a case of juice fruits such as grapes. This phenomenon is considerably amplified when fluids comprising fibres are present. Blockages of material then occur. The service life of the screw is thereby rapidly reduced.

An Archimedes screw produced by assembling sectors is known for example from the document EP 0 200 117 or from the document WO 2008/001171. According to these documents, the sectors have several long pitches and the turn ends, at the connection area of the sectors, at a very fine edge in the form of a bevel. The cores of the sectors of document WO 2008/001171 are also provided, at their connection areas, with male/female parts, more particularly a ribbed/grooved pair, mutually engaging, intended for transmitting torque between sectors. According to the invention, these parts will not enable a high torque to be transmitted without risk of breakage.

To provide a connection between the sections and the shaft, it is also necessary to provide a fixing by the use of shafts in the form of polygons fitting in an identical internal shape produced in the section or by taking a spring ring comprising a key. This solution is however insufficient to provide good holding of the sections consisting of a single long pitch. The sectors in a single thread and one long pitch are particularly easy to manufacture in short runs and are perfectly suited to producing short screws for metering systems. On the other hand assembly by fitting together sectors of a thread involves allowing a thread portion to project to allow fitting together. This configuration weakens the sector and may lead to pulling away of this part of the thread under mechanical stresses.

The device according to the invention remedies these drawbacks. It is a case of an assembly of sectors with a turn having a particular geometry enabling them to be fitted together after assembly on a shaft. This geometry does not allow the formation of gaps or edges that may degrade the performance of the screw. These sectors comprise in fact, according to a first feature, a single thick turn corresponding to only one pitch of the screw. This thread follows a helicoidal curve and terminates in a plane inclined by a particular angle. The thread does not therefore terminate in an edge that may become sharp at the ends. This thread is connected to a core having a sinusoidal shape parallel to that of the thread and the total height of which corresponds to the pitch of the screw. The form of the core allows a stacking of the turns and an interleaving maximising the contact surface. This same core is hollow and comprises a shape enabling it to be fitted on to the shaft. According to a second feature, the helicoidal curve defining the contour of the core is offset from that of the turn by a distance corresponding at least to the thickness of this turn. This offset creates a broad support face on the section of the thread. Thus the user produces an Archimedes screw by successively fitting the sectors the entire face of which is pressed on the following thread without leaving sharp edges or gaps that may degrade the functioning of the screw.

Sectors with a single thread and a high pitch are particularly easy to manufacture in short runs and are perfectly suitable for producing short screws employed for manufacturing metering systems, or for producing screws to measure whatever the length thereof.

Thus the invention concerns a device for producing an Archimedes screw by assembling contiguous sectors.

According to the device in accordance with the invention, the sectors consist of a single long thread corresponding to a screw pitch, constituting a turn of the Archimedes screw, and in which the sectors are interleaved in one another on a shaft, without the formation of gaps or sharp edges, so as to form the helicoidal spiral of the Archimedes screw.

According to one embodiment, the sectors have termination faces of the turn, each termination face being inclined by an angle with respect to the shaft of the sector so that the termination faces mutually in abutment of two successive sectors of the Archimedes screw are able to allow a transmission of torque between said two successive sectors.

According to embodiments taken alone or in combination:

said angle of inclination between the termination face of the turn and the axis of the sector is between 0° and 50°, and preferably between 15° and 30°;

said angle of inclination between the termination face of the turn and the axis of the sector is 25°;

each sector comprises, apart from said thread constituting the turn of the Archimedes screw, a core provided with an opening intended for the passage of a shaft, to within the fitting clearance, said sectors being intended to be fitted on said shaft to produce the Archimedes screw;

the sectors have at least one connection area between cores, said areas being intended to be mutually in abutment between two successive sectors of the Archimedes screw, said connecting area between cores on the one hand and the termination face of the corresponding end turn of said sector on the other hand constituting a support surface, non-planar, in particular without any ridge, the connecting area of the core following in particular a path parallel to the path of the turn;

said opening intended for the passage of the shaft has a polygonal cross section;

the body forming the core and the turn of each sector consists of a moulded plastic piece;

said opening of an end sector passes right through said end sector, said opening having a reduction in internal cross section constituting first a first shoulder intended to constitute a stop for the end of the shaft and secondly a second shoulder intended to constitute a stop for a fixing member, such as a screw, intended to cooperate with said end of said shaft;

the geometric definition of at least one sector is obtained at least by the generation of a volume from a section and a sweeping of this section along a generatrix formed by the helicoidal curve of the turn of said sector, the plane serving as a support for said section, for generating the volume of the turn and the core, being inclined by an angle identical to the angle of inclination between the termination face of the turn and the axis of the sector;

at least one of the sectors is a closed end sector, said turn of said sector being extended by a closure disc with the same diameter as said turn;

at least one of the sectors is an open end sector, one of the ends of the turn of said sector terminating in a rounded free section.

According to particular embodiments:

The core comprises one or more threads the length of which corresponds to a single pitch of the screw.

The central recess enabling assembly on a shaft is hexagonal in shape.

The central recess enabling assembly on a shaft is cylindrical in shape with a key groove.

The central recess enabling assembly on a shaft is square in shape.

The connection of the turn on the core is radiate or at a right angle.

The thread is made from metal or thermoplastic polymer or thermosetting material or composite.

The connection of the helicoidal curve of the turn and that of the core is provided by a radiate shape.

The invention also concerns an Archimedes screw obtained by successive interleavings of sectors of a device according to the invention.

The accompanying drawings illustrate the invention:

FIG. 3 also shows the bearing face of the thread.

FIG. 11 illustrates an Archimedes screw, with a variable pitch, provided with a closed end and an open end, produced by means of a device according to the invention.

FIGS. 12, 13, 14, 15 and 16 are respectively detail views of the sectors making up the Archimedes screw, as illustrated in FIG. 11.

FIGS. 12a, 12b are detailed views of the sector as illustrated in FIG. 12, with dimensioning.

FIG. 12c is a table indicating, for each line of said table, the possible values (in millimeters) of the dimensions of the sector, as illustrated in FIGS. 12a and 12b.

FIGS. 13a, 13b are detail views of the sector as illustrated in FIG. 13, with dimensioning.

FIG. 13c is a table indicating, for each line of said table, the possible values (in millimeters) of the dimensions of the sector, as illustrated in FIGS. 13a and 13b.

FIGS. 14a, 14b are detail views of the sector as illustrated in FIG. 14, with dimensioning.

FIG. 14c is a table indicating, for each line of said table, the possible values (in millimeters) of the dimensions of the sector, as illustrated in FIGS. 14a and 14b.

FIGS. 15a, 15b are detail views of the sector as illustrated in FIG. 15, with dimensioning.

FIG. 15c is a table indicating, for each line of said table, the possible values (in millimeters) of the dimensions of the sector, as illustrated in FIGS. 15a and 15b.

FIGS. 16a, 16b are detail views of the sector as illustrated in FIG. 16, with dimensioning.

FIG. 16c is a table indicating, for each line of said table, the possible values (in millimeters) of the dimensions of the sector, as illustrated in FIGS. 16a and 16b.

FIGS. 17a, 17b are detail views of a closed end sector.

FIG. 17c is a table indicating, for each line of said table, the possible values (in millimeters) of the dimensions of the sector, as illustrated in FIGS. 17a and 17b.

Thus the invention concerns an improvement to the devices of the prior art for producing an Archimedes screw, by assembling contiguous sectors.

Figure 7:
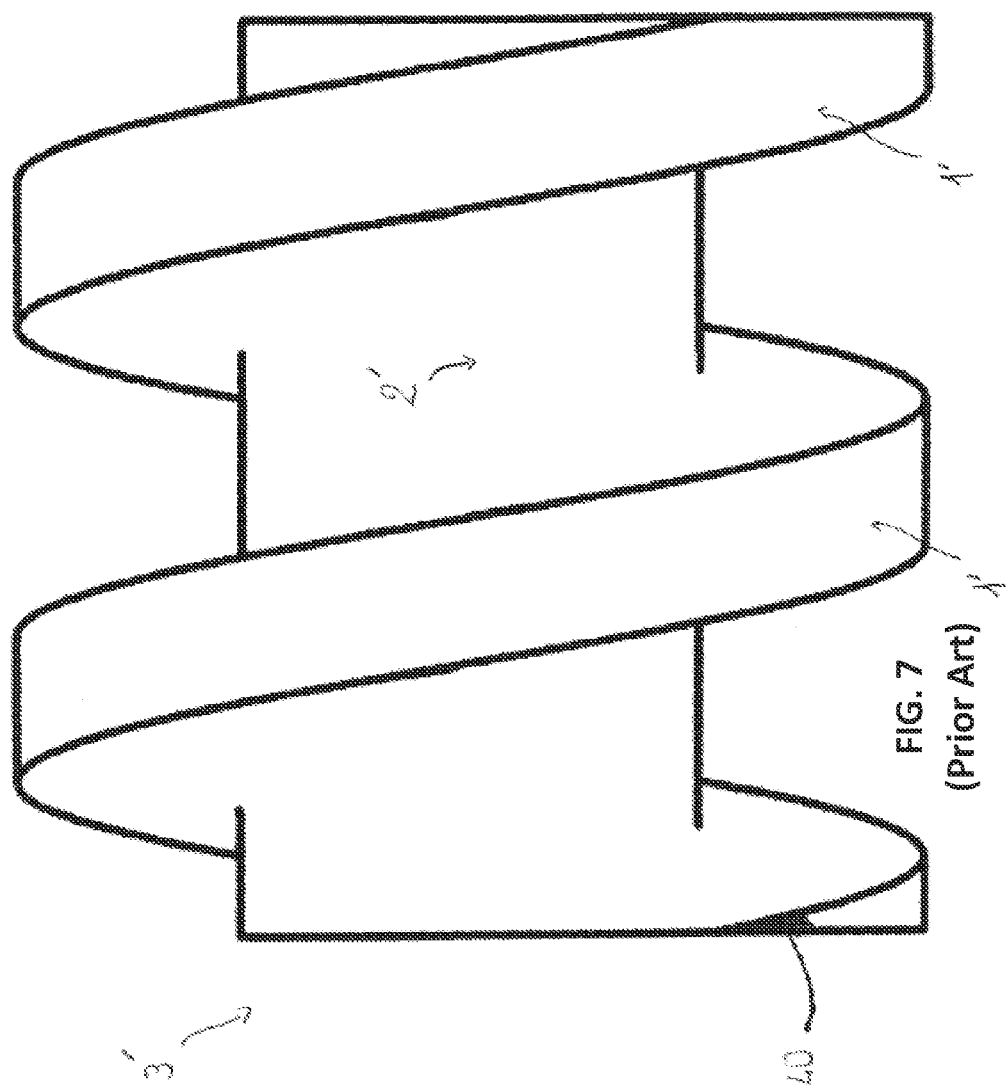
FIG. 7 shows a sector of a device for producing an Archimedes screw, as known from the prior art, illustrating more particularly the bevel shape of the turn at the connecting area between sectors.

FIG. 7 illustrates a sector 3' of a device of the prior art, known to the inventor. It can be seen that this sector 3' has a length corresponding to several pitches of the Archimedes screw. The thread thus forms several turns 1' of the screw. This thread is rigidly secured to a core 2' provided with an opening for passage of a shaft (not illustrated) on which said sectors 3' are fitted.

In this prior art, the transmission of the rotation torque to the sectors of the Archimedes screw is obtained solely by the mechanical contact between the core 2' and the rotation axis of the Archimedes screw, by means of a non-circular, for example polygonal, contact surface between the shaft and the core 2', or by means of a key securing the shaft and core together with respect to rotation. No transmission of torque is possible between the sectors. This solution makes it necessary to provide sectors 3' with a length corresponding to several pitches of the screw in order to ensure sufficient mechanical connection between the shaft and the sectors 3'.

There will also be noted, at the area of connection of the turn 1' between sectors, a reduction in cross section terminating in a sharp edge 40, in the form of a bevel. This sharp edge 40' constitutes not only a fragile area for the Archimedes screw but is also liable to damage the materials conveyed by the Archimedes screw.

The invention remedies these drawbacks.

With reference to these drawings the device comprises a turn 1 with a long thread associated with a helicoidal core 2 of the same length. The assembly constitutes an elementary sector 3. The termination face 4 of the turn is inclined by a given angle 5, by way of non-limitative example of 25° with respect to the axis of the sector 6. The angle 5 may in particular be between 0° and 50°, preferably between 15° and 30°. The base 7 of the termination face 4 is for example normal to the helicoidal generatrix of the thread 8.

The core 2 serving as a base for the turn 1 follows a helicoidal curve 9 parallel at every point to the curve of the thread 8 serving as a generatrix of the turn 1. The helicoidal curve 9 is offset by a value corresponding, by way of non-limitative example, to the thickness 14 of the turn 1 at its base.

The turn 1 and the core 2 constitute a sector 3 the height (length) of which corresponds to a pitch of the Archimedes screw obtained by assembling the sectors 3 on a shaft 13. The geometric definition of the turn 1 and of the core 2 can be obtained by generating a volume or a surface from a section normal to a helicoidal curve corresponding to the pitch of the screw. The plane serving as a support for the section generating the volume of the turn 1 and core 2 is inclined by an angle identical to the angle 5 and gives the inclination of the termination phase 4 of the turn 1. By construction the ends of the core 2 are connected to an area 10 the width of which depends on the angle 5. The connection 11 of the faces of the core 2 is either angular or radiate. This geometry maximises the faces in contact and allows ideal transmission of the rotation torque from the screw through the various sectors 3.

Figure 4:
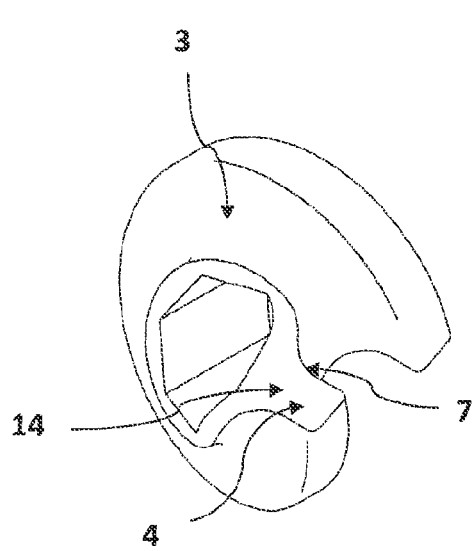
FIG. 4 shows an isometric view of a thread showing the bearing face.
Figure 5:
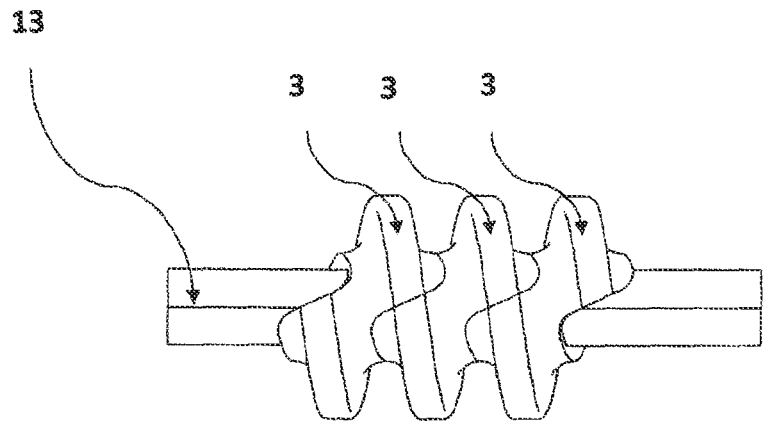
FIG. 5 shows the connection and continuity of the lines of the thread of the various assembled sectors.
Figure 6A:
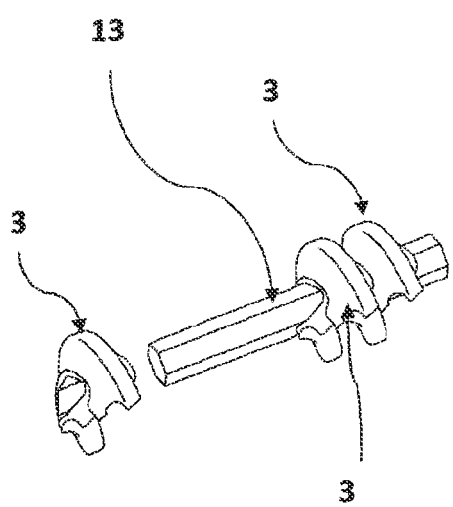
FIGS. 6a, 6b and 6c show the steps of the assembly of the device on a shaft for forming a section of an Archimedes screw, for example consisting of three sectors.
Figure 6B:
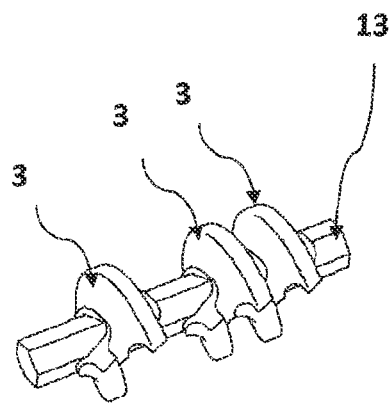
Figure 6C:
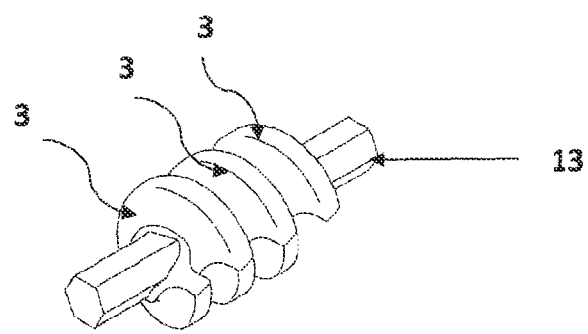

According to the example illustrated in particular in FIG. 4, said areas 10 of connection between cores 2, intended to be mutually in abutment between two successive sectors 3, on the one hand, and the termination face 4 of the turn 1 of the corresponding end of said sector 3 on the other hand, constitute a bearing surface 4, 10 (between sectors 3), non-planar, in particular without a ridge, the area 10 of connection of the core 2 following in particular a path parallel to the path of the turn 1.

Figure 1:
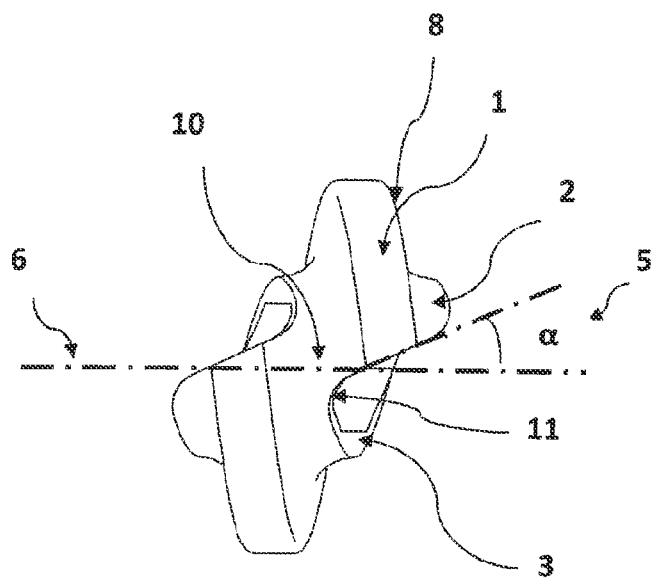
FIG. 1 shows the device in front view and by way of non-limitative example of a sector with a thread and a long pitch.
Figure 2:
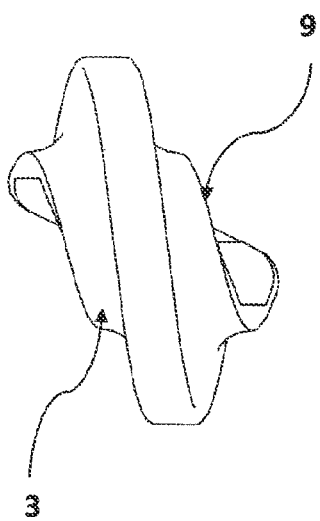
FIG. 2 shows a rear view by way of non-limitative example of a sector composed of a thread revealing the two helicoidal curves constituting the sector of a long pitch.
Figure 3:
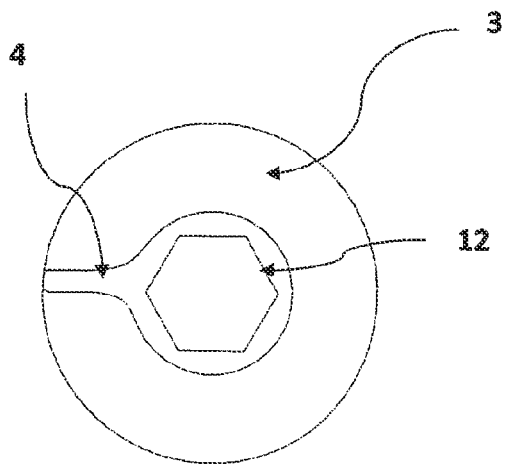
FIG. 3 shows by way of non-limitative example a hexagonal shape enabling sectors to be assembled on a shaft with the same shape.

In the embodiment according to FIG. 3, the sector 3 comprises, at its centre and along the shaft 13 of the Archimedes screw, an opening 12 the shape of which corresponds to that of the shaft 13. The dimensions of the opening 12 are ideally adjusted to allow mounting by sliding along the shaft 13 without the formation of an excessive clearance between the shaft 13 and the sector 3.

According to a variant embodiment illustrated in FIG. 4, the sector 3 thus obtained has the particularity of fitting on other sectors 3 without leaving gaps or leading to the formation of sharp edges when these same sectors 3 are assembled on a shaft 13 that is, by way of non-limitative example, hexagonal in shape. The assembly of these sectors 3 on a shaft 13 produces an Archimedes screw. The length of the screw thus produced depends on the length of the shaft 13 and the number of sectors 3. The fixing of the first and last sectors 3 of the Archimedes screw for holding the assembly on the shaft 13 is obtained by conventional mechanical fixing such as screwing or bolting.

In order to facilitate assembly, according to one embodiment, each intermediate sector 3 of the Archimedes screw may have, respectively at its two ends, two identical bearing surfaces 4, 0, so as to be able to be assembled indifferently in one direction of the other on said shaft 13.

Figure 10:
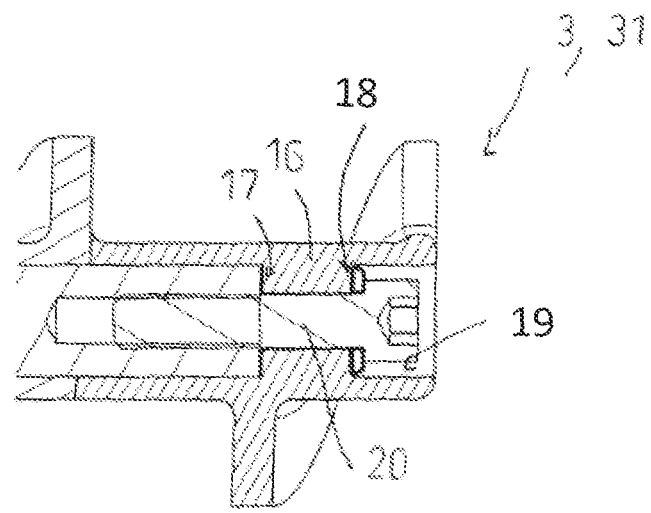
FIG. 10 is a view in section, along a plane passing through the axis of the Archimedes screw, illustrating the fixing of an end sector to the end of the shaft of said screw.

According to one embodiment, in particular illustrated according to an example in FIG. 10, said opening 12 of an end sector 31, 35, 36 of the Archimedes screw passes right through said end sector 31, 35, 36 and has an internal reduction in cross section 16.

This reduction in cross section 16 forms firstly a first shoulder 17 intended to constitute a stop for the end of the shaft 13, and secondly a second shoulder 18 intended to constitute a stop for a fixing member 20 intended to cooperate with said end of said shaft 13.

Figure 18:
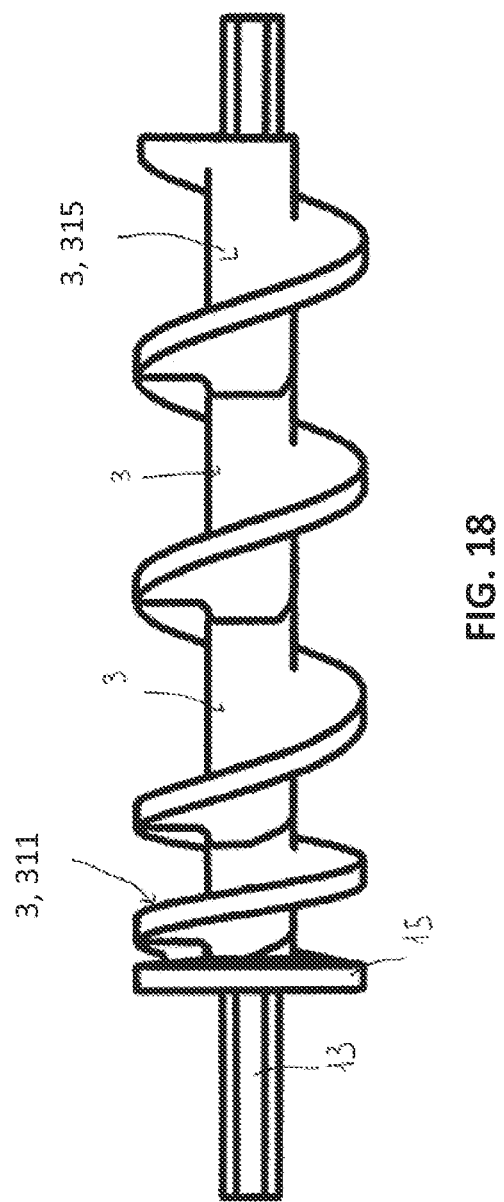
FIG. 18 illustrates an Archimedes screw, provided with a closed end and an open end, produced by means of a device according to the invention according to one embodiment.

According to another embodiment illustrated in FIG. 18, the end sector 311, 315, in particular open or closed, may have no reduction in cross section, said shaft 13 emerging in particular projecting from said section 311, 315.

The sectors 3 are then held together by any suitable means, in particular by screwing.

According to the example in FIG. 10, the fixing member is a fixing screw that engages by screwing with a tapping at the end of the shaft 13. The first shoulder 17 is in abutment with the end of the shaft 13. The second shoulder 18 is in abutment with the end of the fixing screw which, as illustrated, can be housed in the opening 12. Optionally one or more washers, in particular Bellville washers, can be provided between the fixing member 20, in particular the head of the screw, and said second shoulder 18.

Figure 8:
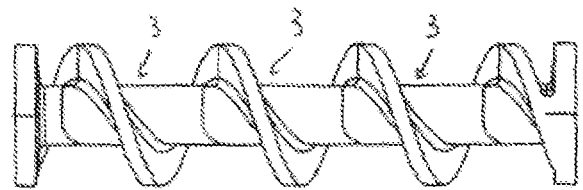
FIG. 8 illustrates an Archimedes screw, with a constant pitch, provided with a closed end and an open end, produced by means of a device according to the invention.
Figure 9:
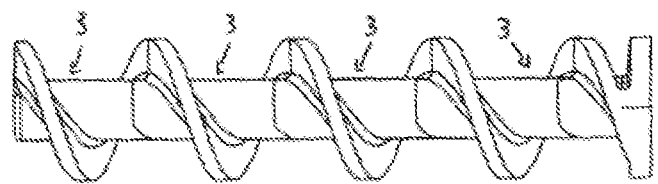
FIG. 9 illustrates an Archimedes screw, with a constant pitch, provided with a closed end and an open end, produced by means of a device according to the invention.

According to one embodiment, the device makes it possible to produce an Archimedes screw having a closed end as illustrated in FIG. 9 or 11, or even two closed ends as illustrated in FIG. 8.

To this end, one of the sectors 3 at least is a closed end sector 31, 36, said turn 1 of said sector 31, 36 being extended by a closure disc 15, with the same diameter as said turn 1.

According to one embodiment, the device makes it possible to produce an Archimedes screw having an open end, as illustrated in FIG. 9 or 11, or even two open ends.

For this purpose one of the sectors 3 at least is an open end sector 35, one of the ends of the turn 1 of said sector terminating in a free edge 21, in particular rounded.

The invention makes it possible to produce Archimedes screws with a constant pitch, as illustrated in particular in FIGS. 8 and 9, or Archimedes screws with variable pitch, as illustrated in FIG. 11.

The tables in FIGS. 12c, 13c, 14c, 15c, 16c and 17c illustrate, by way of non-limitative examples, various sizings of the sectors 31, 32, 33, 34, 35, 36. Each line of a table represents an example of possible sizing for a sector 3.

In these tables:
- the dimension F is the diameter of the thread (or of the turn 1),
- the dimension H is the pitch of the Archimedes screw (or of the turn 1),
- the dimension J is the diameter of the web of the sector, also referred to as the core 2,
- the dimension G is the dimension for the passage of the shaft 13.

According to the example in FIG. 11, it should be noted that the screw pitch of the sectors marked 31, 32 is less than the screw pitch of the sectors marked 34 and 35. In order to provide continuity of the Archimedes screw between these sectors 31, 32, 34, 35, a transition sector 33 is provided, the turn 1 of which affords perfect continuity of the thread of the Archimedes screw between two screw sections, with distinct pitches.

In the particular case of this transmission section 33, the dimension H of the table as illustrated in FIG. 14c indicates, for each line in the table, two distinct values. The first value (e.g. 25 millimeters, line 1 of the table) corresponds to the screw pitch of the preceding sector 32 of the Archimedes screw to which the transition sector 33 must be connected, the second value (e.g. 50 millimeters, line 1 of the table) corresponding to the screw pitch of the following sector 34 of the Archimedes screw to which the transition sector 33 must be connected.

Moreover, the body forming the core 2 and the turn 1 of each sector 3 may consist of a plastic part in a single piece. Each of the sectors may in particular be fabricated, easily and at less cost, from a synthetic material, such as plastic, by injection moulding techniques.

By way of non-limitative example, the sector 3 will have dimensions of 100 mm in diameter for a pitch height of around 40 mm.

The device according to the invention is particularly intended for producing systems for metering or pumping viscous, powdery or granular products comprising at least one Archimedes screw.

The invention claimed is:

1. A kit for producing an Archimedes screw comprising several contiguous sectors (3), wherein
   the sectors (3) consist of a single long thread corresponding to a screw pitch, constituting a turn (1) of the Archimedes screw,
   the sectors (3) are interleaved in one another on a shaft (13), without the formation of gaps or sharp edges, in such a way as to form the helicoidal spiral of the Archimedes screw, and in that the sectors (3) have termination faces (4) of a turn (1), each termination face (4) being inclined by an angle (5) greater than 0° C. with respect to the axis (6) of the sector (3) so that the termination faces (4) mutually in abutment of two successive sectors (3) of the Archimedes screw are able to provide a transmission of torque between said two successive sectors (3), and
   each sector (3) comprises, apart from the thread (1) constituting the turn (1) of the Archimedes screw, a core (2) provided with an opening (12) for passage of said shaft (13), within a fitting clearance, said sectors (3) fitted on said shaft (13) in order to produce the Archimedes screw, and in which the sectors (3) have areas (10) of connection between cores (2), said areas (10) of connection between cores (2) being mutually in abutment between two successive sectors (3) of the Archimedes screw, said area (10) of connection between cores (2) of a sector (3) and the termination face (4) of the turn (1) of the corresponding end of said sector (3) constituting a non-planar bearing surface (4, 10) between sectors (3).

2. The kit according to claim 1, wherein said angle of inclination (5) between the termination face (4) of the turn (1) and the axis (6) of the sector (3) is between 0° and 50°.

3. The kit according to claim 1, wherein said angle of inclination (5) between the termination face (4) of the turn (1) and the axis (6) of the sector (3) is 25°.

4. The kit according to claim 1, wherein said bearing surface (4, 10) between sectors (3) has no ridge.

5. The kit according to claim 1, wherein said opening (12) for the passage of the shaft (13) has a polygonal cross section.

6. The kit according to claim 1, wherein the body forming the core (2) and the turn (1) of each sector (3) consists of a plastic part in a single piece.

7. The kit according to claim 1, wherein said opening (12) for the passage of the shaft (13) of an end sector (31, 35, 36) passes right through said end sector (31, 35, 36), said opening (12) for the passage of the shaft (13) having a reduction in internal cross section (16) constituting first a first shoulder (17) to constitute a stop for the end of the shaft (13) and a second shoulder (18) to constitute a stop for a fixing member (20) to cooperate with said end of said shaft (13).

8. The kit according to claim 1, wherein the geometric definition of at least one sector (3) is obtained at least by generating a volume from a cross section and scanning this cross section along a generatrix formed by the helicoidal curve of the turn (1) of said sector (3), the plane serving as a support for said cross section, enabling generation of the volume of the turn (1) and core (2), being inclined by an angle identical to the angle of inclination (5) between the termination face (4) of the turn (1) and the axis (6) of the sector (3).

9. The kit according to claim 1, wherein one of the sectors (3) at least is a sector with a closed end (31, 36, 311), said turn (1) of said sector (31, 36, 311) being extended by a closure disc (15) with the same diameter as said turn (1).

10. An Archimedes screw obtained by successive interleavings of the sectors of a device according to claim 1 assembled on shaft (3).

11. The kit according to claim 1, wherein said angle of inclination (5) between the termination face (4) of the turn (1) and the axis (6) of the sector (3) is between 15° and 30°.

* * * * *